United States Patent
Fujita

(10) Patent No.: US 6,864,996 B1
(45) Date of Patent: Mar. 8, 2005

(54) IMAGE PROCESSOR AND IMAGE PROCESSING METHOD, AND PRINTER SYSTEM EQUIPPED WITH IMAGE PROCESSOR

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 09/643,298

(22) Filed: Aug. 22, 2000

(30) Foreign Application Priority Data

Aug. 23, 1999 (JP) .......................................... 11-235775

(51) Int. Cl.$^7$ ............................ H04N 1/405; H04N 1/46
(52) U.S. Cl. ...................... 358/3.13; 358/3.16; 358/3.2; 358/523; 358/536
(58) Field of Search ............................... 358/3.13, 3.16, 358/3.2, 523, 534, 535, 536

(56) References Cited

U.S. PATENT DOCUMENTS

| 5,270,835 A | | 12/1993 | Urabe et al. ................ 358/456 |
| 5,542,031 A | * | 7/1996 | Douglass et al. .......... 358/1.15 |
| 5,696,603 A | | 12/1997 | Toyomura et al. .......... 358/458 |
| 6,172,767 B1 | * | 1/2001 | Takemoto .................... 358/1.9 |

FOREIGN PATENT DOCUMENTS

| EP | 0 204 094 A2 | 12/1986 | ............ H04N/1/40 |
| EP | 0 503 645 A2 | 9/1992 | ............ H04N/1/40 |
| EP | 0 634 862 A1 | 1/1995 | ............ H04N/1/40 |
| EP | 0 731 597 A2 | 9/1996 | .......... H04N/1/405 |
| EP | 1 026 878 A2 | 8/2000 | .......... H04N/1/405 |
| JP | 60-165873 | 8/1985 | |
| JP | 62-293887 | 12/1987 | |
| WO | WO 93/03574 | 2/1993 | ............ H04N/1/40 |

OTHER PUBLICATIONS

Patent Abstracts of Japan; Publication No. 62–293887; Dec. 21, 1987, 2 pgs.
Patent Abstracts of Japan; Publication No. 60–165873; Aug. 29, 1985, 2 pgs.
Partial Translation of relevant sections of Publication Nos. 62–293887 and 60–165873, 2 pgs.
Notice of Reasons for Rejection cited in Japanese Patent Appl. H11–235775 (2 pgs.), and English translation thereof (3 pgs.)
European Search Report, dated Jun. 25, 2002, 4 pages.

* cited by examiner

Primary Examiner—Thomas D. Lee
(74) Attorney, Agent, or Firm—Osha & May L.L.P.

(57) ABSTRACT

An image processor includes conversion table storage for storing a plurality of conversion tables to determine a correspondence relationship between image reproduction data, including development area information, and tone data; halftone processing for receiving the tone data of respective colors and then finding, for each color, the image reproduction data at each dot by referring to one of the conversion tables; and an image reproducing engine for reproducing images by receiving the image reproduction data at each dot for each color and by determining a development area at the dot on the basis of the development area information included in the image reproduction data.

4 Claims, 12 Drawing Sheets

FIG. 2

| 6 | 1 | 5 | 8 | 3 | 5 | 10 | 4 | 4 | 11 | 4 | 4 |
|---|---|---|---|---|---|----|---|---|----|---|---|
| 12 | 4 | 4 | 10 | 4 | 4 | 11 | 4 | 4 | 10 | 5 | 3 |
| 9 | 5 | 3 | 9 | 3 | 1 | 8 | 5 | 2 | 7 | 7 | 2 |
| 6 | 7 | 1 | 7 | 7 | 2 | 5 | 6 | 2 | 5 | 12 | 4 |
| 5 | 8 | 1 | 5 | 9 | 3 | 4 | 11 | 4 | 4 | 10 | 4 |
| 4 | 11 | 4 | 4 | 9 | 4 | 4 | 12 | 5 | 3 | 10 | 5 |
| 4 | 10 | 5 | 3 | 8 | 5 | 1 | 6 | 6 | 1 | 6 | 6 |
| 2 | 7 | 7 | 1 | 7 | 6 | 1 | 5 | 9 | 1 | 5 | 12 |
| 2 | 5 | 12 | 3 | 4 | 9 | 4 | 4 | 12 | 4 | 4 | 10 |
| 4 | 4 | 10 | 4 | 4 | 12 | 4 | 2 | 9 | 5 | 3 | 7 |
| 5 | 3 | 8 | 5 | 2 | 6 | 6 | 1 | 6 | 6 | 1 | 5 |
| 7 | 2 | 6 | 7 | 1 | 5 | 6 | 1 | 5 | 8 | 3 | 4 |

F I G. 4

|  | Tone Data | | | | |
|---|---|---|---|---|---|
|  | 0 | 1 | 2 | • • • | 2 5 5 |
| Identifier1 | 0 | 8 0 | 1 9 0 | • • • | 2 5 5 |
| Identifier2 | 0 | 5 0 | 1 0 0 | • • • | 2 5 5 |
| Identifier3 | 0 | 2 0 | 4 0 | • • • | 2 5 5 |
| ⋮ | ⋮ | ⋮ | ⋮ |  | ⋮ |
| Identifier12 | 0 | 0 | 0 | • • • | 2 5 5 |

FIG. 6A

| 4 | 3 | 2 | 4 | 4 | 5 | 6 | 12 | 10 | 7 | 5 | 4 |
|---|---|---|---|---|---|---|----|----|---|---|---|
| 4 | 5 | 7 | 12 | 10 | 10 | 6 | 5 | 4 | 3 | 1 | 3 |
| 11 | 10 | 7 | 5 | 4 | 3 | 1 | 1 | 4 | 5 | 6 | 8 |
| 4 | 4 | 2 | 2 | 4 | 5 | 6 | 9 | 12 | 9 | 6 | 5 |
| 4 | 4 | 5 | 6 | 11 | 12 | 6 | 5 | 4 | 2 | 1 | 1 |
| 10 | 11 | 8 | 5 | 4 | 4 | 1 | 1 | 4 | 4 | 6 | 6 |
| 5 | 4 | 1 | 2 | 3 | 4 | 5 | 6 | 9 | 12 | 6 | 5 |
| 3 | 4 | 3 | 7 | 9 | 9 | 8 | 7 | 4 | 4 | 2 | 1 |
| 8 | 10 | 9 | 7 | 5 | 4 | 3 | 1 | 3 | 4 | 5 | 7 |
| 5 | 4 | 3 | 1 | 1 | 4 | 5 | 7 | 12 | 10 | 8 | 6 |
| 1 | 4 | 5 | 7 | 8 | 11 | 10 | 7 | 5 | 4 | 3 | 2 |
| 6 | 12 | 9 | 6 | 5 | 4 | 4 | 2 | 2 | 4 | 5 | 7 |

FIG. 6B

| 7 | 5 | 4 | 2 | 2 | 4 | 4 | 5 | 6 | 9 | 12 | 6 |
|---|---|---|---|---|---|---|---|---|---|----|---|
| 2 | 3 | 4 | 5 | 7 | 10 | 11 | 8 | 7 | 5 | 4 | 1 |
| 6 | 8 | 10 | 12 | 7 | 5 | 4 | 1 | 1 | 3 | 4 | 5 |
| 7 | 5 | 4 | 3 | 1 | 3 | 4 | 5 | 7 | 9 | 10 | 8 |
| 1 | 2 | 4 | 4 | 7 | 8 | 9 | 9 | 7 | 3 | 4 | 3 |
| 5 | 6 | 12 | 9 | 6 | 5 | 4 | 3 | 2 | 1 | 4 | 5 |
| 6 | 6 | 4 | 4 | 1 | 1 | 4 | 4 | 5 | 8 | 11 | 10 |
| 1 | 1 | 2 | 4 | 5 | 6 | 12 | 11 | 6 | 5 | 4 | 4 |
| 5 | 6 | 9 | 12 | 9 | 6 | 5 | 4 | 2 | 2 | 4 | 4 |
| 8 | 6 | 5 | 4 | 1 | 1 | 3 | 4 | 5 | 7 | 10 | 11 |
| 3 | 1 | 3 | 4 | 5 | 6 | 10 | 10 | 12 | 7 | 5 | 4 |
| 4 | 5 | 7 | 10 | 12 | 6 | 5 | 4 | 4 | 2 | 3 | 4 |

FIG. 7

| Angle Difference | Moire Size Ratio |
|---|---|
| 10 | 5.74 |
| 20 | 2.88 |
| 30 | 1.93 |
| 40 | 1.46 |
| 50 | 1.18 |
| 60 | 1.00 |
| 70 | 0.87 |
| 80 | 0.78 |
| 90 | 0.71 |
| 100 | 0.65 |
| 110 | 0.61 |
| 120 | 0.58 |
| 130 | 0.55 |

FIG. 8A

| | Combination of Screen Angles | Angle Difference | Moire Size Ratio | Moire Direction |
|---|---|---|---|---|
| Moire | 27°−60° | 33° | 1.76 | 133.5° |
| | 27°−117° | 90° | 0.71 | 162.0° |
| | 27°−150° | 123° | 0.57 | 178.5° |
| | 60°−117° | 57° | 1.05 | 178.5° |
| | 60°−150° | 90° | 0.71 | 15.0° |
| | 117°−150° | 33° | 1.76 | 43.5° |

| | Combination of Screen Angles | Angle Difference | Moire Size Ratio |
|---|---|---|---|
| Secondary Moire | 15°−27° | 12° | 4.78 |
| | 43.5°−60° | 16.5° | 3.48 |

FIG. 8B

| | Combination of Screen Angles | Angle Difference | Moire Size Ratio | Moire Direction |
|---|---|---|---|---|
| Moire | 18°−72° | 54° | 1.10 | 135.0° |
| | 18°−108° | 90° | 0.71 | 153.0° |
| | 18°−162° | 144° | 0.53 | 0.0° |
| | 72°−108° | 36° | 1.62 | 0.0° |
| | 72°−162° | 90° | 0.71 | 27.0° |
| | 108°−162° | 54° | 1.10 | 45.0° |

| | Combination of Screen Angles | Angle Difference | Moire Size Ratio |
|---|---|---|---|
| Secondary Moire | 0°−18° | 18° | 3.20 |
| | 18°−27° | 9° | 6.37 |

F I G. 1 0
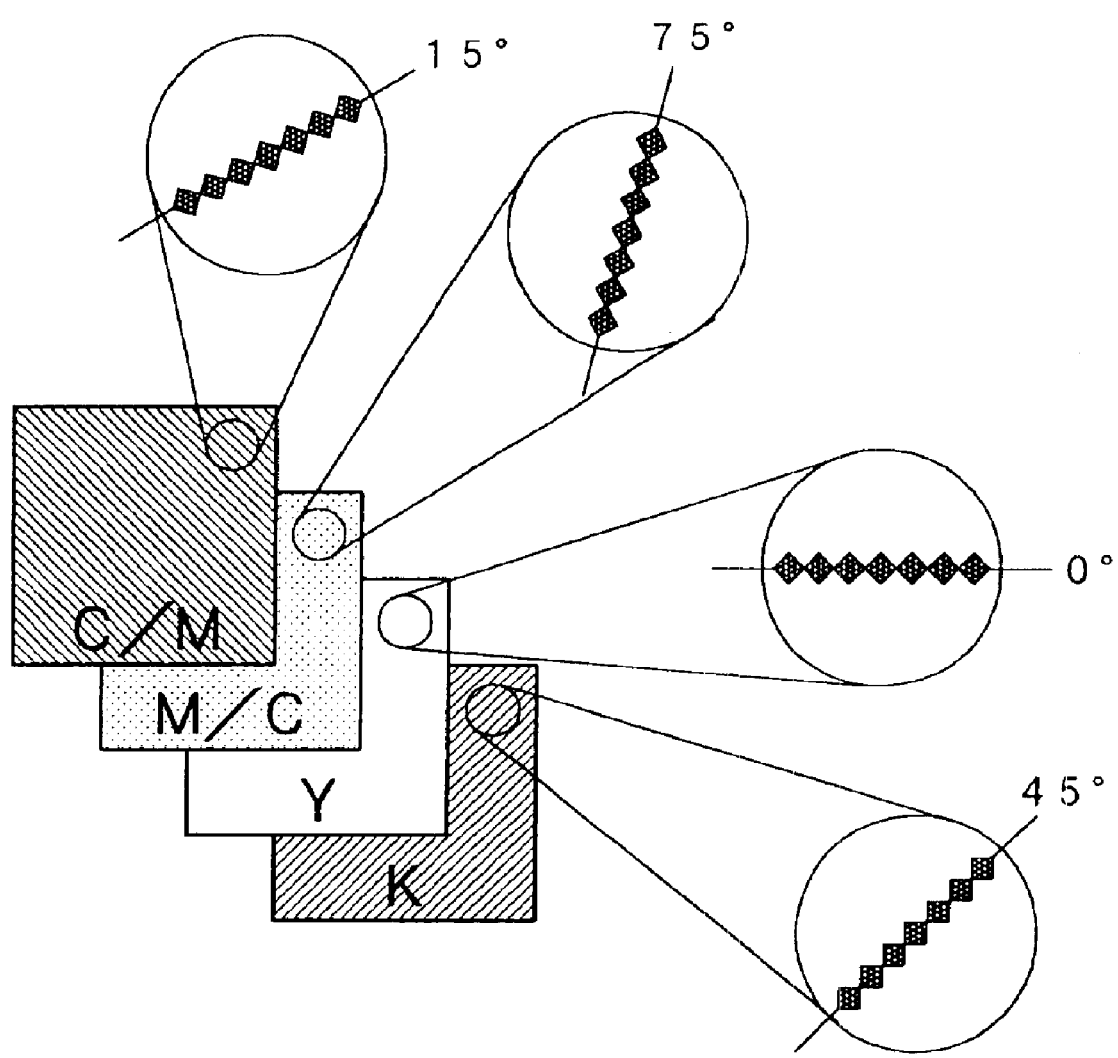

IMAGE PROCESSOR AND IMAGE PROCESSING METHOD, AND PRINTER SYSTEM EQUIPPED WITH IMAGE PROCESSOR

BACKGROUND OF THE INVENTION

1. Field of the Invention

The present invention relates to image processing techniques for generating halftone spot images in order to make continuous-tone prints like photographs. More in particularly, this invention relates to image processing techniques for setting screen angles determined by conversion tables used for the generation of halftone spot images in such a manner as to weaken the effect of moire.

2. Description of the Related Art

An electrophotography method is known as an image recording method used for color printers, color copying machines, and the like. In such an electrophotography method, laser beams are utilized to form latent images on a photoconductor drum, the latent images are developed by using charged toner, and developed images formed with the toner are transferred and fixed on transfer paper, thereby recording the images.

Such color printers and the like record color images generally by utilizing toner in cyan (C), magenta (M), yellow (Y), and black (K). The respective colors which are expressed in intermediate tones are mixed by means of subtractive color mixture, thereby generating record images.

As an intermediate tone expression method, a dither method is known in which a pseudo intermediate tone expression is realized by using binary recording. The dither method is a method of obtaining binary data through conversion from tone data at each dot by using a threshold value that is changeable for every dot, and dots in an original image are in a one-to-one correspondence with dots in a record image. A general way to determine a threshold value for each dot is to consider an original image as a set of submatrices and to decide a threshold value only according to coordinate information in the relevant submatrix. The submatrices with such threshold values located therein are called dither matrices. Since the dither matrices are referred to when the tone data of the original images are converted into the gradation expression of the record images, the dither matrices can be considered as a kind of conversion tables from the original images to the record images.

There are some kinds of conversion tables like the dither matrices, such as a dot dispersion type and a dot concentration type. In the case of the dot concentration type, a plurality of adjacent dots compose a halftone spot, and intermediate tones are expressed according to the size of this halftone spot. In this specification of the present invention, record images of which intermediate tones are expressed with halftone spots in the manner described above are called halftone spot images.

SUMMARY OF THE INVENTION

Since halftone spot images are generated by periodically applying conversion tables to original images, components (such as an arrangement style of threshold values) and periodical application of the conversion tables determine a halftone spot shape, screen angles, and other elements of the halftone spot images.

Screen angles are closely related to characteristics of moiré which may occur when halftone spot images of more than one color are overlaid one over another. Specifically, an angle difference between the screen angles is related to the size of moiré which may occur. For example, when halftone spot images of three colors are overlaid one over another, it is possible to minimize moiré by setting angle differences between their screen angles at 30° intervals.

When halftone spot images our colors CMYK are overlaid one over another, angle differences between screen angles of adjacent colors among cyan, magenta and black are set at 30° intervals, excluding yellow which is the color with lower spectral luminous efficiency as compared with the other colors and is barely perceptible to the human eyes. As for yellow, an angle difference is set at a middle value between cyan or magenta, and black.

As for black which has the highest spectral luminous efficiency and is easily perceptible to the eyes, a screen angle is set at 45° which is the farthest from horizontal and vertical directions (0° and 90°) which humans can easily perceive. As a result, the screen angles of cyan and magenta respectively become 15° and 75° which are displaced 30° from the screen angle 45° of black, and the screen angle of yellow becomes 0°. FIG. 10 shows a combination of the screen angles of the four colors CMYK.

If the screen angles of the tour colors CMYK are set in the manner described above, the angle differences between the three colors, excluding yellow, are set at 30° intervals and, therefore, produced moiré will become sufficiently small.

However, since the angle difference between the screen angles of yellow and cyan (or magenta) is 15°, there is a problem in that larger moiré is produced as compared with the other combinations. In fact, the size of moire generated by having the yellow halftone spot image and the cyan (or magenta) halftone spot image overlap each other becomes almost four times as large as a halftone spot pitch in a screen.

It is an object of this invention to provide an image processing technique for sufficiently reducing the size of moiré even when the four colors CMYK are used.

On the other hand, in the electrophotography method which utilizes laser beams and the like, dots of record images are located fixedly in a main scanning direction for scanning laser beams and in a secondary scanning direction for feeding transfer paper and, therefore, it is impossible to rotate the dot arrangement of the record images according to desired screen angles. Accordingly, an adopted method of forming a screen angle is to displace the applied positions of conversion tables or to change the values in the conversion tables according to the applied positions.

For example, FIG. 11 shows a method of forming a screen angle by displacing the positions of dither matrices 30 which are the conversion tables. In FIG. 11, a straight line 31 indicates a screen direction. In this example, the dither matrices 30 are located in such a manner that every time they are displaced by four dots in the X axis direction, they are also displaced by one dot in the Y axis direction. Accordingly, an interval (a, b) becomes (4, 1) and a screen angle θ is formed to obtain $\tan\theta = b/a = 1/4$.

In the above-described method, however, it is impossible to form irrational tangent angles such as 15° and 75°. This is because the dot arrangement is formed, if expressed in a coordinate system, as an integer coordinate system and, therefore, the values of a and b mentioned above always become integer values. With regard to the expression of $\tan\theta = b/a$, the angle θ where the values of a and b are any integer values is called a rational tangent angle, while The angle θ otherwise obtained is called an irrational tangent angle.

Consequently, in the case of the four colors CMYK as shown in FIG. 10, there is a problem in that with regard to the screen angles of cyan and magenta, one has in fact no other choice but to use rational tangent angles which are close to the values of 15° and 75°.

There is another problem in that the use of the rational tangent angles as the screen angles results in the generation of unintended patterns. This problem is caused by a phenomenon in which if halftone spot images having rational tangent angles as their screen angles are placed one over another, halftone spots completely overlap one another at regular intervals.

FIG. 12 shows an example of overlapping two halftone spot images having rational tangent angles as their screen angles, where a first halftone spot image has a screen angle of $\tan^{-1} \frac{1}{3}$ (approximately 18°) and a second halftone spot image has a screen angle of $\tan^{-1} 3$ (approximately 72°). A halftone spot 100 indicates a halftone spot of the first halftone spot image, a halftone spot 101 indicates a halftone spot of the second halftone spot image, and a halftone spot 102 indicates a overlapping halftone spot of the two halftone spot images. FIG. 12 shows that the halftone spots 102 occur at regular intervals.

Since this problem occurs depending on common multiples of the denominator and numerator or a rational tangent, it cannot be avoided as long as the respective screen angles are rational tangent angles. Specifically, if halftone spots of the four colors CMYK completely overlap one another, there is a problem in that very conspicuous patterns are generated.

Accordingly, it is another object of this invention to provide an image processing technique for forming desired screen angles and angle differences, which are irrational tangent angles, and for preventing halftone spots of the four colors CMYK from completely overlapping one another at regular intervals.

In order to achieve the above objects, in an image processing method of this invention, conversion tables to determine a correspondence relationship between image reproduction data, including development area information, and tone data are stored in a storing means, and the conversion tables include: at least two conversion tables A and B where the correspondence relationship is determined in such a manner that halftone spots are formed in lines and their screen angles are perpendicular to each other; and at least one conversion table C where the correspondence relationship is determined in such a manner that angle differences between a screen angle determined by the conversion table C and the screen angles determined by the two conversion tables A and B become irrational tangent angles. Then, for each of the plural colors (for example, for each color of CMYK), the image reproduction data at each dot is found from the tone data at each dot by referring to one of the conversion tables, and a development area at each dot is determined on the basis of the development area information included in the image reproduction data at the dot, thereby reproducing images.

Moreover, in order to achieve the aforementioned objects, an image processor of this invention comprises: conversion table storing means for storing a plurality of conversion tables to determine a correspondence relationship between image reproduction data, including development area information, and tone data; halftone processing means for receiving the tone data of respective colors and then finding, for each color, the image reproduction data at each dot by referring to one of the conversion tables; and image reproducing engine for reproducing images by receiving the image reproduction data at each dot for each color and by determining a development area at the dot on the basis of the development area information included in the image reproduction data. The conversion table storing means stores: at least two conversion tables A and B where the correspondence relationship is determined in such a manner that halftone spots are formed in lines and their screen angles are perpendicular to each other; and at least one conversion table C where the correspondence relationship is determined in such a manner that angle differences between a screen angle determined by the conversion table C and the screen angles determined by the two conversion tables A and B become irrational tangent angles.

BRIEF DESCRIPTION OF THE DRAWINGS

FIG. 2 shows an example of an index table according to this invention.

FIG. 4 is a diagram illustrative of an example of the gamma tables according to this invention.

FIG. 6 shows FIGS. 6A and 6B show examples of a halftone spot image generated according to this invention.

FIG. 7 shows the correspondence of angle differences of screen angles to moiré size ratios.

FIG. 8 shows FIGS. 8A and 8B show the relationship between screen angles, moiré size ratios, moiré directions, and moiré size ratios and moiré directions of secondary moiré.

FIG. 10 is a conceptual drawing illustrative of a combination of screen angles of four colors CMYK.

DETAILED DESCRIPTION OF THE PREFERRED EMBODIMENTS

Embodiment 1

Embodiment 1 of this invention is hereinafter explained by referring to FIG. 1. An image processor 1 according to Embodiment 1 of this invention is composed by including conversion table storing means 10, halftone processing means 11, and image reproducing engine 12.

The conversion table storing means 10 stores a plurality of conversion tables where a correspondence relationship is determined between image reproduction data, including development area information, and tone data. The development area information is information used to decide an area where toner should be attached at each dot, that is, an area to be developed. Examples of such information may include an area ratio to the relevant dot, and pulse width data to be used for a laser drive signal.

The image reproduction data may be composed by further including development area location information. The development area location information is the information used to decide a location where toner should be attached at each dot, that is, the information used to decide which area in the dot should be developed. An example of such information may be relative location information about the locations relative to a laser scan direction, such as the right or left side of a dot.

As described above, it is possible to realize desired screen angles by including the development area information and the development area location information in the image reproduction data. Such principles will be described later.

A conversion table can be composed of, for example, a plurality of gamma tables to determine a relationship between the tone data and the development area information and an index matrix where identifiers to specify the gamma tables are located at their corresponding positions on the matrix.

The development area location information may be composed in correspondence with each gamma table or may be composed in correspondence with the relevant positions on the index matrix.

FIG. 2 shows an example of the conversion table. In this example, the size of the index matrix is 12×12. At the respective positions on the matrix, the following information is indicated: identifiers (numbers) of the gamma tables; and the development area location information(not shown in FIG. 2), that is, to which side (right/left or above/below) of the relevant dot the toner should be attached.

Figure 3:
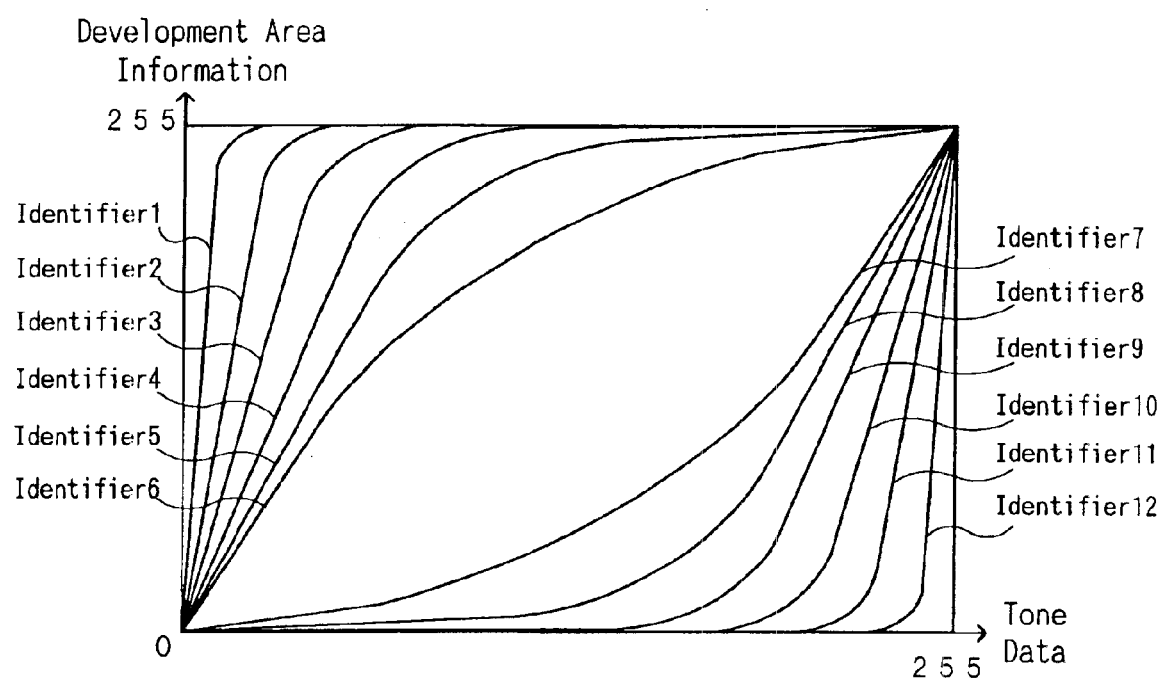
FIG. 3 is a diagram showing an example of gamma tables, as graphs, according to this invention.

FIG. 3 is a diagram which expresses the gamma tables as graphs. The horizontal axis represents the tone data and 256 tones are employed in this embodiment. The vertical axis represents a ratio of toner attachment area. Such a ratio is "0" when the toner is not to be attached at all, while the ratio is "255" when the toner is to be attached over the entire area of the dot.

By the conversion table storing means 10, the gamma tables are stored in the form of a table as shown in FIG. 4 by quantizing each graph in FIG. 3.

As shown in FIG. 3, each gamma table has different characteristics. As the gamma tables of the identifiers 1 through 6 show sudden increases at an early stage, they have such characteristics that halftone spots are formed fast in the dots where such gamma tables are applied. As the gamma tables of the identifiers 7 through 12 show sudden increases at an later stage, they have such characteristics that halftone spots are formed slowly in the dots where such gamma tables are applied.

Figure 5:
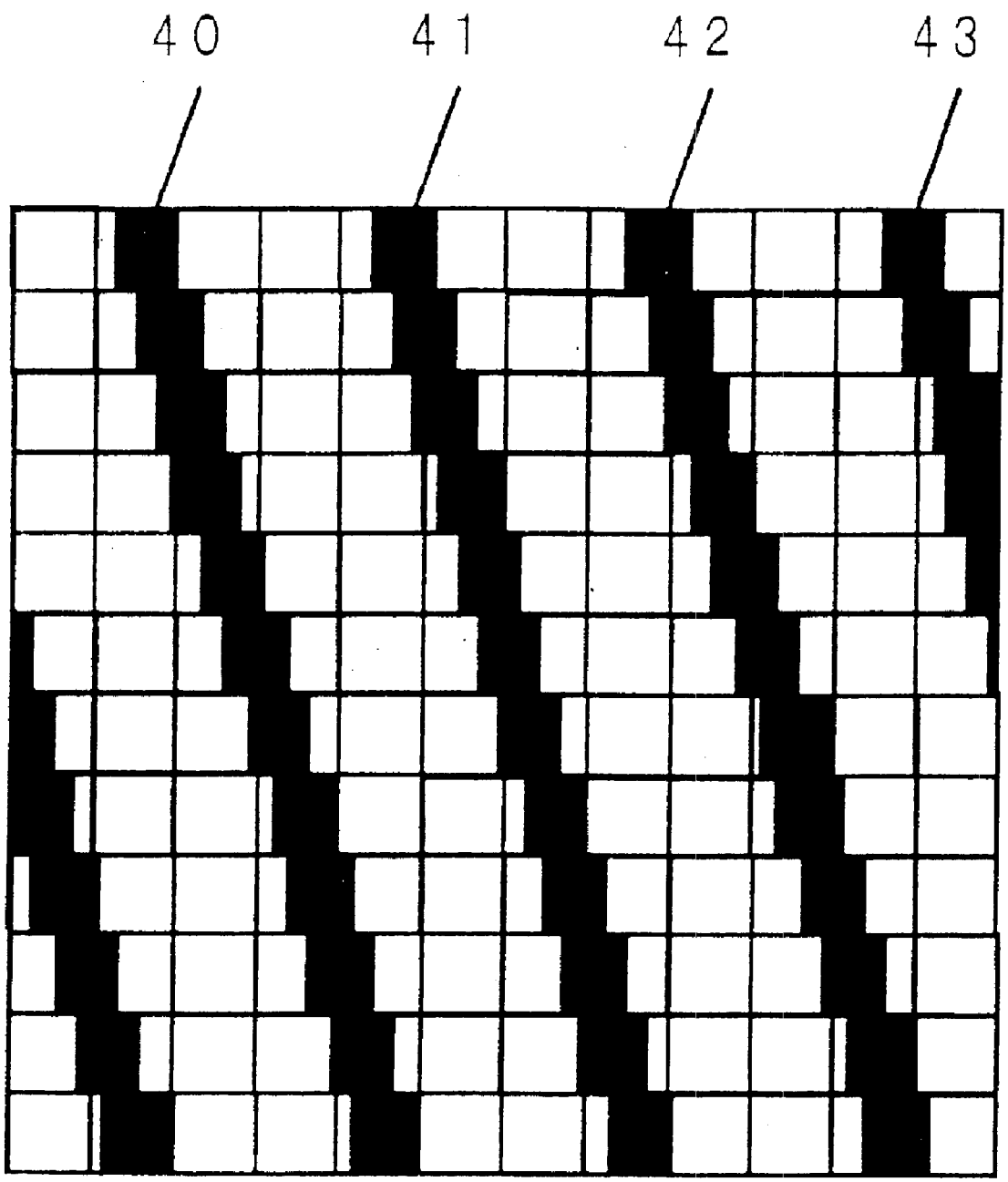
FIG. 5 shows an example of a halftone spot image generated according to this invention.

The shape of halftone spots, such as a dot shape or a line shape, screen angles, and other details are decided depending on the composition of the conversion tables, that is, how the gamma tables having characteristics of fast or slow formation of halftone spots are located on the index matrix. The index matrix of FIG. 2 and the gamma tables of FIG. 3 are composed in such a manner that halftone spots will be formed in lines. FIG. 5 shows an example of a halftone spot image where halftone spots are formed in such manner.

Referring to FIG. 5, by observation of halftone spots in a horizontal row (or vertical row) direction, for example, halftone spots 40, 41, 42 and 43 in a horizontal row, it can be found that the halftone spots are formed respectively in different ways (how many dots are used to form one halftone spot, and at which positions of the dots the halftone spot is formed). Such a state where the formation of the halftone spots are different in a horizontal row direction or in a vertical row direction indicates that the index matrix and the gamma tables are composed so as to form a screen angle of irrational tangent. On the other hand, if the index matrix and the gamma tables are composed so as to form a screen angle of the rational tangent, halftone spots will be formed in the same manner in a horizontal row direction and in a vertical row direction.

The halftone processing means 11 receives the tone data for each color externally and selects, for each color, one of the plural conversion tables stored in the conversion table storing means 10. It then finds the image reproduction data at each dot on the basis of the tone data at the dot by referring to the selected conversion table.

The tone data for each color to be received by the halftone processing means 11 maybe the type that corresponds to an RGB color space or the type that corresponds to a CMYK color space. Since toner used for printers or the like is generally in four colors CMYK, if the tone data corresponding to the RGB color space is received, conversion from RGB to CMYK is first performed and the selected conversion table is then referred to. For such conversion from RGB to CMYK, various kinds of conventional techniques can be employed.

The image reproducing engine 12 receives, for each of the colors, the image reproduction data at each dot from the halftone processing means 11, generates a drive signal on the basis of the development area information and the development area location information included in the image reproduction data, generates a laser drive pulse modulated in a pulse width modulation method on the basis of the drive signal, drives a laser diode according to the drive pulse, and irradiates a photoconductor drum with laser beams. Since the drive signal includes information about an irradiation area as well as irradiation locations, the laser beams are applied and toner is attached in a desired area and at desired positions within each dot on the basis of such information.

The principles are hereinafter described, according to which a line-shaped halftone spot image with a desired screen angle can be realized according to this invention by including the development area information and the development area location information in the image reproduction data.

According to this invention, the image reproduction data is composed by including the development area information, that is, the information about an area to attach toner. Therefore, based on such information, it is possible to control a pulse width of a pulse signal for driving lasers. Moreover, by composing the image reproduction data so as to include the development area location information, that is, the information about locations to attach toner, it is possible to control the timing of the pulse signal for driving lasers on the basis of such information.

In the case of a development method of fixing toner by utilizing laser beams, controlling the timing and pulse width of the pulse signal for driving lasers can generate a development area at any position and in any area within the relevant area corresponding to a dot. As a result, by controlling the area and location of the development area at each dot, it is possible to general halftone spots in lines, which are composed of a plurality of dots.

Regarding the halftone spots generated in the manner described above, a line direction and a line pitch can be decided freely by changing the area and location of the development area in each dot. Therefore, a screen angle (or line direction) can be formed freely regardless of the arrangement of dots.

EXAMPLE 1

Example 1 is hereinafter described about the structure of conversion tables stored by the conversion table storing means 10.

The conversion table storing means 10 stores at least two conversion tables A and B. These two conversion tables A and B are composed respectively of an index matrix and gamma tables in such a manner that halftone spots are formed in lines and the screen angles determined by the conversion tables A and B are perpendicular to each other.

The principles are hereinafter described, according to which the use of the conversion tables to form halftone spots in lines can sufficiently reduce the size of moire as compared to the size of the conversion tables even in the case of he four colors CMYK.

When halftone spots are formed in lines, two overlapping halftone spot images with their screen angles perpendicular to each other can be considered one halftone spot image in which dot-shaped halftone spots are generated at points of intersection of the lines.

Namely, if the conversion tables A and B are used for two colors out of the four colors CMYK, it is possible to consider with regard to the two colors that a dot-shaped halftone spot image only for one color exists. Accordingly, with regard to he four colors CMYK, it is only necessary to adjust the screen angles substantially for three colors. Therefore, it is possible to minimize moiré by setting angle differences between the screen angles of the three colors at 30° intervals.

In order to compose the conversion tables that determine their screen angles perpendicular to each other, for example, common gamma tables may be used and their index matrices may be related to each other in such a manner that one of them is rotated by ±90° from the other. For example, the index matrix shown in FIG. 2 maybe used as the conversion table A, and as the conversion table B the index matrix shown in FIG. 6A, which is created by rotating the index matrix of FIG. 2 by 90° in a positive direction, or the index matrix shown in FIG. 6B, which is created by rotating the index matrix of FIG. 2 by 90° in a negative direction, may be used. Accordingly, it is possible to make the screen angles determined by the conversion tables A and B perpendicular to each other. The positive direction means a counterclockwise rotation, while the negative direction means a clockwise rotation.

However, those shown an FIG. 2 and FIG. 6 are merely examples, and the conversion tables with any content may be used as long as they are composed in such a manner that the screen angles are perpendicular to each other and halftone spots are formed in lines.

The conversion table storing means 10 further stores at least one conversion table C. In the conversion table C, an index matrix and gamma tables are composed in such a matter that angle differences between a screen angle determined by the conversion table C and the screen angles determined by the conversion tables A and B become irrational tangent angles.

As for the conversion tables A and C that satisfy the above-described requirement, either one of their screen angles always becomes an irrational tangent angle. This is because, due to the relationship of tan $(\theta_1-\theta_2)$=(tan $\theta_1$-tan $\theta_2$)/(1+tan $\theta_1$ tan $\theta_2$), the value of $\theta_1-\theta_2$ being an irrational tangent angle means that either one of the numerator (tan $\theta_1$-tan $\theta_2$) or the denominator (1+tan $\theta_1$ tan $\theta_2$) is an irrational number. Accordingly, it is necessary for either one of tan $\theta_1$ or tan $\theta_2$ to be an irrational number.

Therefore, when a halftone spot image X obtained by overlaying two halftone spot images one over another, which are generated by applying the conversion tables A and B, is overlaid over a halftone spot image Y generated by applying the conversion table C, such a problem does not occur as will occur in the case of overlapping halftone spot images both with rational tangent angles as their screen angles, that is, the problem in that halftone spots completely overlap each other at regular intervals.

EXAMPLE 2

Example 2 is hereinafter described about the structure of conversion tables stored by the conversion table storing means 10.

The conversion table storing means 10 further stores a conversion table D in addition to conversion tables A, B and C which are composed in the same manner as in Example 1. In the conversion tables C and D, their index matrices and gamma tables are composed in such a manner that halftone spots are formed in lines and their screen angles are perpendicular to each other.

Since the conversion table C is composed in such a manner that angle differences between a screen angle determined by the conversion table C and screen angles determined by the conversion tables A and B become irrational tangent angles, the conversion table D, of which the screen angle is perpendicular to that of the conversion table C, is also composed so as to have irrational tangent angles as angle differences between the screen angle determined by the conversion table D and the screen angles determined by the conversion tables A and B.

When the conversion tables A, B, C, and D are used for each of the four colors CMYK, a combination of A and B and a combination of C and D can be considered respectively a dot-shaped halftone spot image of one color. Accordingly, in the case of Example 2, it is only necessary to adjust the screen angles of substantially two colors with respect to the four colors CMYK.

An explanation is hereinafter given about on what standards each screen angle should be determined.

Moiré size K can be found by the formula described below on the basis of an angle difference α between screen angles, and a screen pitch d. As for the derivation of the formula to find the moiré size, detailed descriptions are stated in "Principles of Color Reproduction" (written by John A. C. Yule, published by the publishing department of the Printing Society, p.p. 312–314).

$$K=d/(2 \sin(\alpha/2)) \qquad (1)$$

It is possible to calculate what multiple of a screen pitch the moiré is (hereinafter referred to as the "moiré size ratio") by applying d=1 to the above formula. FIG. 7 shows a correspondence relationship between the angle differences of screen angles and the moiré size.

A direction where moiré is aligned (hereinafter referred to as the "moiré direction") can be obtained by the formula of (p+q)/2+90° where p and q are respective screen angles.

It is known that with regard to human visual characteristics, the detecting ability is higher and more sensitive in vertical and horizontal directions than in slanting directions. Accordingly, it is possible to minimize the effects of moiré by composing the screen angles so as to set the moiré direction in a slanting direction with regard to moiré of a high moiré size ratio.

As can be seen from FIG. 7, the moiré size ratio increases when the angle difference is small. Consequently, a screen angle determined by either one of the conversion tables A and B, which has a smaller angle difference with the screen angle determined by the conversion table C, is set as follows:

Assuming that an angle difference between the screen angle of the conversion table A and the screen angle of the conversion table C is smaller than that between the screen angle of the conversion table B and the screen angle of the conversion table C, in order to cause the moiré direction of moiré generated by the conversion tables A and C to become a slanting direction (approximately 45° direction or 135° direction), it is only necessary to compose the conversion tables A and C in such a manner that a sum of their screen angles becomes approximately 90° or −90°.

Specifically speaking, where the angle difference between the screen angles of A and C is β, the index matrix and gamma tables of each conversion table is to be composed so as to set the screen angle of A at (±90°−β)/2 and the screen angle of C at (±90°+β)/2.

Moiré which is generated secondarily due to interference between moiré and the original halftone spot images is called secondary moire. The secondary moiré in the case of overlapping halftone spot images of two colors is inhibited when an angle difference between their screen angles is in the range of 30° to 40°. Accordingly, the conversion tables are composed so as to set the above-mentioned value β at an irrational tangent angle in the range of 30° to 40° in order to inhibit the primary moiré and the secondary moiré.

On the above-described standards, for example, with regard to the conversion tables A, B, C, and D, their screen angles may be set at 27°, 117°, 60°, and 150° respectively. In this case, an angle difference between the screen angles of A and C is 33°, which is an irrational tangent angle in the range of 30° to 40°. Moreover, a sum of the screen angles of A and C is 87°, which is approximately 90°.

FIG. 8A shows moiré size ratios, moiré directions, and moiré size ratios of secondary moiré in this case. Regarding a combination of A (27°) and C (60°) where the moiré size ratio is the highest, it can be seen that the moiré direction is 133.5° which is a slanting direction.

For comparison, FIG. 8B shows moiré size ratios, moiré directions, and moiré size ratios of secondary moiré where with regard to the conversion tables A, B, C, and D, their screen angles are set at 18°, 108°, 72°, and 162° respectively. In this case, a sum of the screen angles of A and C is 90°, but an angle difference between the screen angles is 54°, which does not satisfy the requirement that the angle difference should be an irrational tangent angle in the range of 30° to 40°. Consequently, it can be seen that regarding a combination of B (108°) and C (72°) where the moiré size ratio is the highest, the moiré direction is 0° that is a horizontal direction in which the human detecting ability is high.

As described above, by composing the relevant conversion tables so as to satisfy the requirements of this invention, it is possible to set the moiré direction at a slanting direction with regard to moiré with a highest moiré size ratio, thereby reducing the effects of moiré.

Embodiment 2

Figure 9:
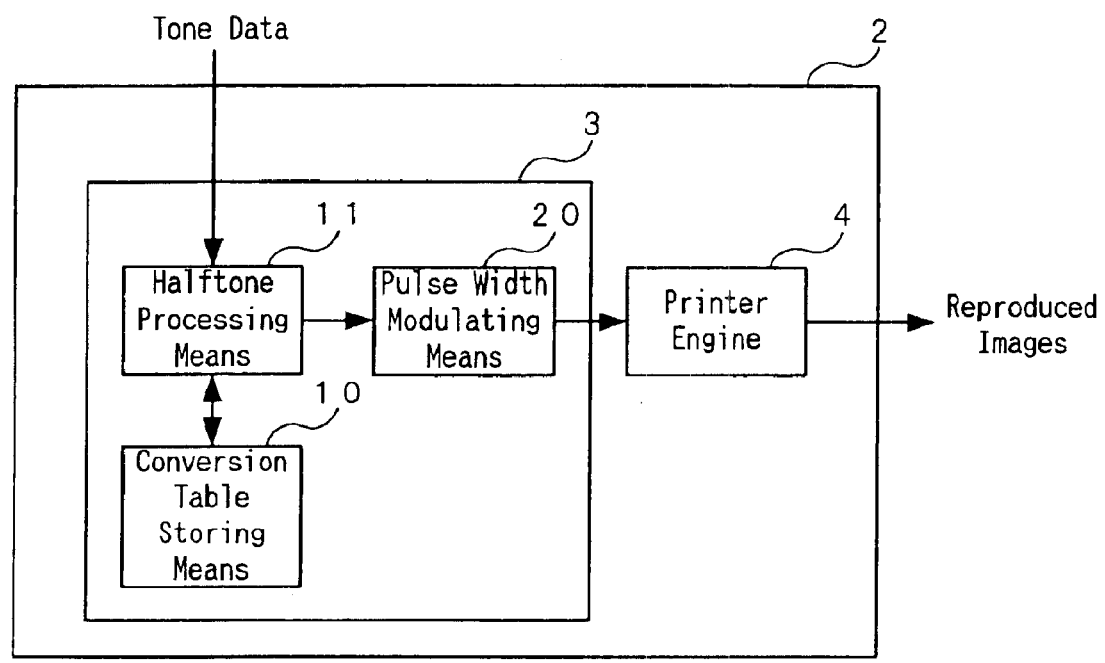
FIG. 9 is a block diagram illustrative of the structure of Embodiment 2 according to this invention.
Figure 11:
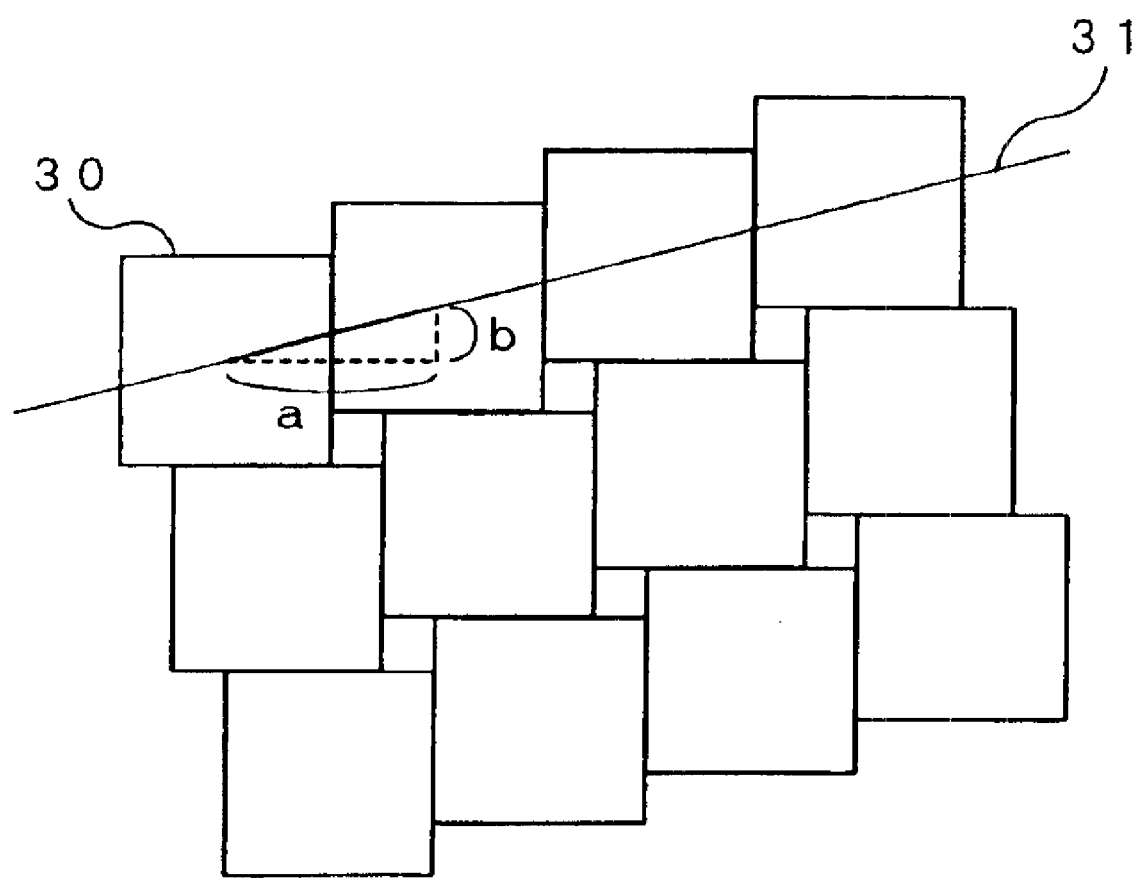
FIG. 11 describes a method of forming a screen angle.
Figure 12:
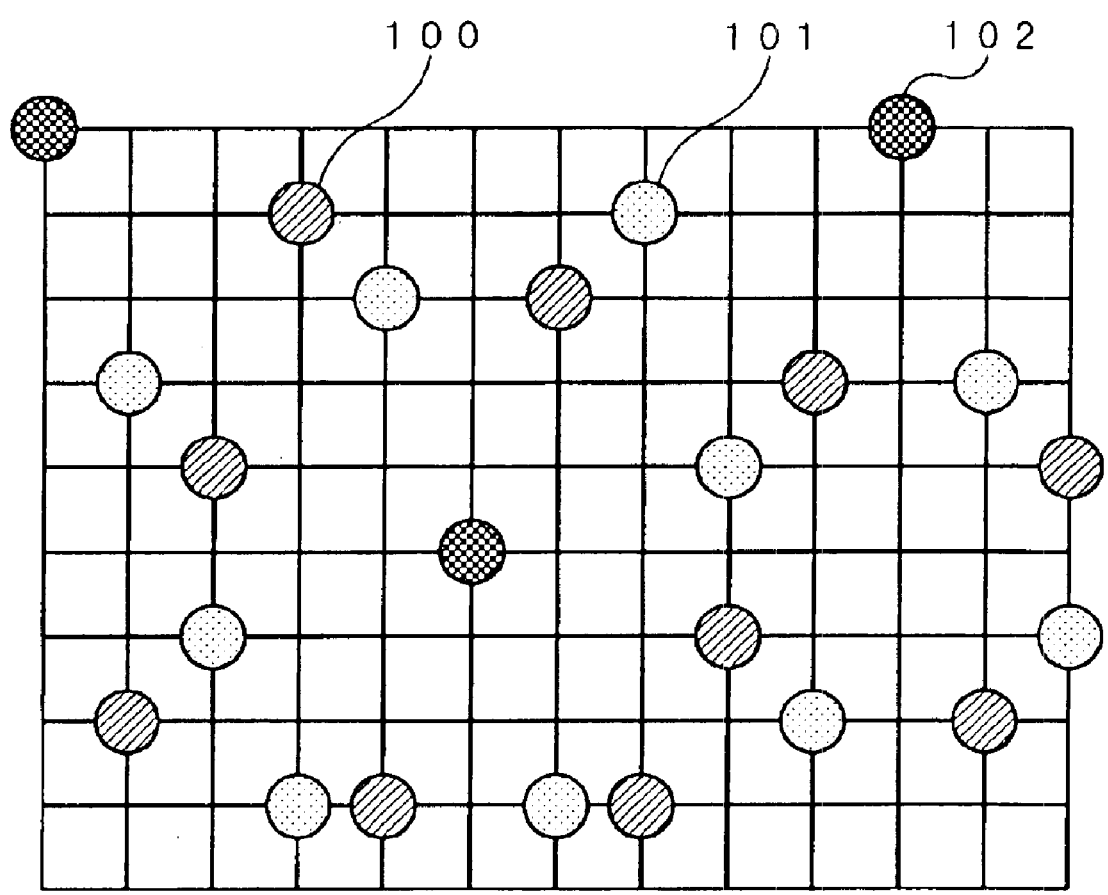
FIG. 12 describes the state where halftone spot images overlap one anther.

Embodiment 2 is hereinafter described with reference to FIG. 9. A printer system 2 according to Embodiment 2 of this invention is composed by including a controller 3 and a printer engine 4.

The controller 3 is composed of conversion table storing means 10, halftone processing means 11, and pulse width modulating means 20. The controller 3 may either be a device specialized for the printer system or be realized by activating software, on which the operation of each means is specified, at a general-purpose information processing unit. The structure and operation of the conversion table storing means 10 and the halftone processing means 11 are similar to those of Embodiment 1 and, therefore, descriptions thereof are omitted.

The pulse width modulating means 20 receives, for each color, image reproduction data at each dot from the halftone processing means 11 and generates and outputs a drive signal corresponding to development area information and development area location information on the basis of the image reproduction data.

The printer engine 4 receives the drive signal from the pulse width modulating means 20, generates a laser drive pulse modulated in a pulse width modulating method on the basis of the drive signal, drives a laser diode according to the drive pulse, and irradiates a photoconductor drum with laser beams.

The pulse width modulating means 20 and the printer engine 4 according to Embodiment 2 correspond to the image reproducing engine 12 according to Embodiment 1.

Embodiment 3

Embodiment 3 of this invention is hereinafter described. Embodiment 3 comprises a record medium with an image processing program recorded thereon. This record medium may be a CD-ROM, a magnetic disk, a semiconductor memory, or any other types of record medium, including the case where the image processing program is distributed through networks.

The image processing program is read from the record medium into a data processor and controls the operation of the data processor. As controlled by the image processing program, the data processor stores, as conversion tables to determine a correspondence relationship between image reproduction data, including development area information, and tone data: at least two conversion tables A and B in which the correspondence relationship is determined in such a manner that halftone spots are formed in lines and their screen angles are perpendicular to each other; and at least one conversion table C in which the correspondence relationship is determined in such a manner that angle differences between a screen angle determined by the conversion table C and the screen angles determined by the conversion tables A and B become irrational tangent angles.

Figure 1:
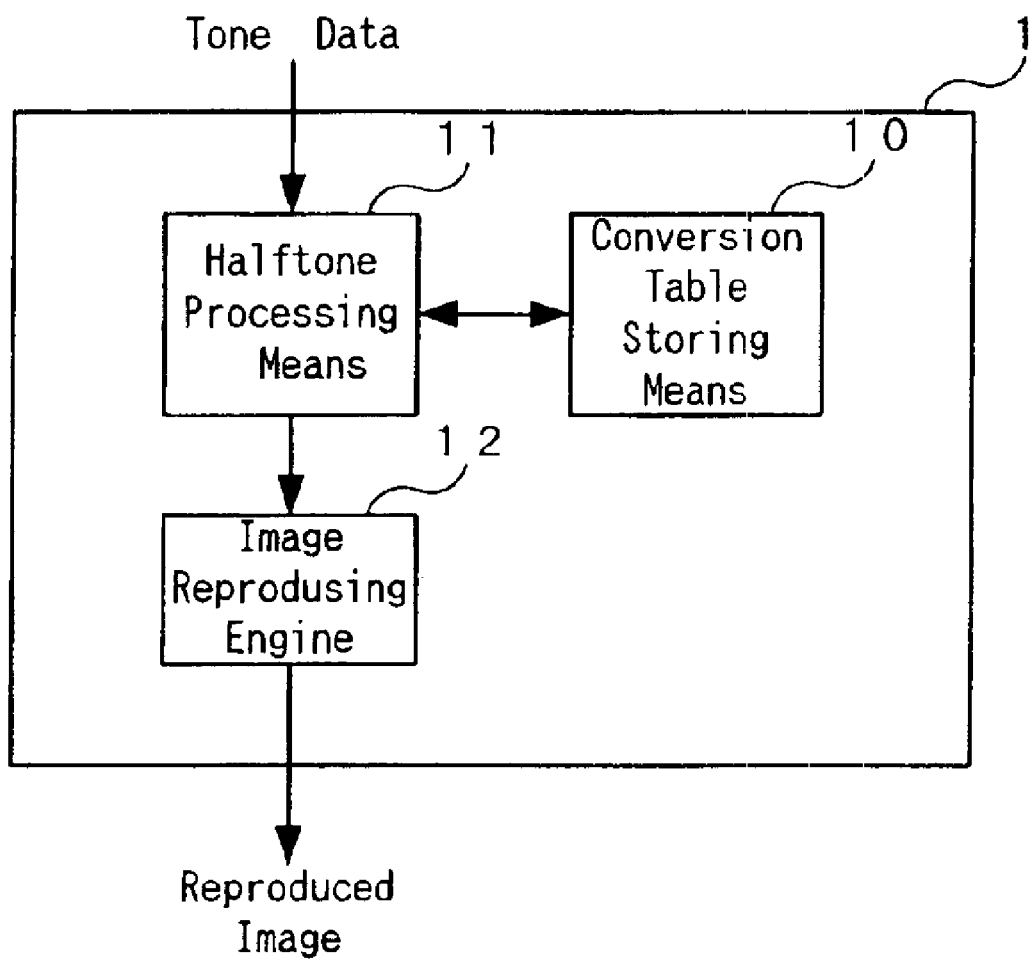
FIG. 1 is a block diagram illustrative of the structure of Embodiment 1 of this invention.

In other words, under control of the image processing program, the data processor performs the same processing as that of the conversion table storing means 10 as shown in FIG. 1.

Moreover, under control of the image processing program, the data processor stores, in a storing means, as conversion tables to determine a correspondence relationship between image reproduction data, including development area information, and tone data: at least two conversion tables A and B in which the correspondence relationship is determined in such a manner that halftone spots are formed in lines and their screen angles are perpendicular to each other; and at least one conversion table C in which the correspondence relationship is determined in such a manner that angle differences between a screen angle determined by the conversion table C and the screen angles determined by the conversion tables A and B become irrational tangent angles. The data processor then finds, for each of plural colors, the image reproduction data at each dot from the tone data at each dot by referring to one of the conversion tables.

In other words, under the control of the image processing program, the data processors performs the same processing as that of the conversion table storing means 10 and the halftone processing means 11 as shown in FIG. 1.

Other Variations

The present invention is not limited to the above-described embodiments and can be applied by making various variations. For example, the respective means included in the controller may be structured as separate devices. For example, the conversion table storing means 10 and the halftone processing means 11 may be realized by a control program installed on a host computer, and the pulse width modulating means 20 may be realized by a control program installed on a printer device.

This invention comprises two conversion tables A and B composed in such a manner that halftone soots are formed in lines and their screen angles are perpendicular to each other, and a conversion table C composed in such a manner that angle differences between a screen angle determined by the conversion table C and the screen angles determined by the conversion tables A and B become irrational tangent angles, thereby making it possible to sufficiently reduce the size of moiré even when the four colors CMYK are used.

Moreover, according to this invention, the conversion tables have the development area information included in the image reproduction data, thereby making it possible to set the screen angles and the angle differences at irrational tangent angles. As a result, it is possible to prevent the halftone spots of the four colors CMYK from completely overlapping one another at regular intervals.

The entire disclosure of Japanese Patent Application No. H11-235775 filed on Aug. 23, 1999 including specification, claims, drawings and summary are incorporated herein by reference in its entirety.

What is claimed is:

1. An image processor comprising:
    conversion table storing means for storing a plurality of conversion tables to determine a correspondence relationship between image reproduction data, including development area information, and tone data;
    halftone processing means for receiving the tone data of respective colors and then finding, for each color, the image reproduction data at each dot by referring to one of the conversion tables; and
    image reproducing engine for reproducing images by receiving the image reproduction data at each dot for each color and by determining a development area at the dot on the basis of the development area information included in the image reproduction data;
    wherein the conversion table storing means stores:
    at least two conversion tables A and B where the correspondence relationship is determined in such a manner that halftone spots are formed in lines and screen angles are perpendicular to each other; and
    at least one conversion table C where the correspondence relationship is determined in such a manner that angle differences between a screen angle determined by the conversion table C and the screen angles determined by the two conversion tables A and B become irrational tangent angles,
    wherein said halftone processing means refers to one of the conversion tables for each color, and determines three image reproduction data corresponding to the respective conversion tables A, B, and C, and
    wherein at least one conversion table C is composed of at least:
    a gamma table to determine a relationship between the tone data and the development area information; and
    an index matrix in which an identifier to specify the gamma table is located at a corresponding position on the matrix.

2. An image processor according to claim 1, wherein regarding index matrices of the two conversion tables A and B, one index matrix is formed by rotating the other index matrix by 90° in a clockwise direction or a counterclockwise direction.

3. An image processor comprising:
    conversion table storing means for storing a plurality of conversion tables to determine a correspondence relationship between image reproduction data, including development area information, and tone data;
    halftone processing means for receiving the tone data of respective colors and then finding for each color, the image reproduction data at each dot by referring to one of the conversion tables; and
    image reproducing engine for reproducing images by receiving the image reproduction data at each dot for each color and by determining a development area at the dot on the basis of the development area information included in the image reproduction data;
    wherein the conversion table storing means stores:
    at least two conversion tables A and B where the correspondence relationship is determined in such a manner that halftone spots are formed in lines and screen angles are perpendicular to each other; and
    at least one conversion table C where the correspondence relationship is determined in such a manner that angle differences between a screen angle determined by the conversion table C and the screen angles determined by the two conversion tables A and B become irrational tangent angles,
    wherein said halftone processing means refers to one of the conversion tables for each color, and determines three image reproduction data corresponding to the respective conversion tables A, B, and C, and
    wherein regarding the conversion table A and the conversion table C, a sum of their screen angles is approximately 90° or −90° and an angle difference between their screen angles is an irrational tangent angle within the range of 30° to 40°.

4. An image processor comprising:
    conversion table storing means for storing a plurality of conversion tables to determine a correspondence relationship between image reproduction data, including development area information, and tone data;
    halftone processing means for receiving the tone data of respective colors and then finding, for each color, the image reproduction data at each dot by referring to one of the conversion tables; and
    image reproducing engine for reproducing images by receiving the image reproduction data at each dot for each color and by determining a development area at the dot on the basis of the development area information included in the image reproduction data;
    wherein the conversion table storing means stores:
    at least two conversion tables A and B where the correspondence relationship is determined in such a manner that halftone spots are formed in lines and screen angles are perpendicular to each other; and
    at least one conversion table C where the correspondence relationship is determined in such a manner that angle differences between a screen angle determined by the conversion table C and the screen angles determined by the two conversion tables A and B become irrational tangent angles,
    wherein said halftone processing means refers to one of the conversion tables for each color, and determines three image reproduction data corresponding to the respective conversion tables A, B, and C, and wherein the conversion table storing means further stores a conversion table D, and in the conversion table C and the conversion table D the correspondence relationship is determined in such a manner that halftone spots are formed in lines and their screen angles are perpendicular to each other.

* * * * *